United States Patent
Moss

(10) Patent No.: US 9,649,720 B2
(45) Date of Patent: May 16, 2017

(54) METHOD OF MAKING A BRACKET ASSEMBLY FOR A BRAKE ASSEMBLY

(71) Applicant: ArvinMeritor Technology, LLC, Troy, MI (US)

(72) Inventor: Peter Moss, Detroit, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 15/041,299

(22) Filed: Feb. 11, 2016

(65) Prior Publication Data

US 2016/0158879 A1 Jun. 9, 2016

Related U.S. Application Data

(63) Continuation of application No. 14/340,800, filed on Jul. 25, 2014, now Pat. No. 9,327,363.

(51) Int. Cl.
| | | |
|---|---|---|
| *B23K 20/12* | (2006.01) | |
| *F16D 65/22* | (2006.01) | |
| *F16D 51/20* | (2006.01) | |
| *F16D 65/60* | (2006.01) | |
| *F16D 51/00* | (2006.01) | |
| *F16D 125/30* | (2012.01) | |
| *B23K 101/00* | (2006.01) | |

(52) U.S. Cl.
CPC ............ *B23K 20/129* (2013.01); *B23K 20/12* (2013.01); *F16D 51/20* (2013.01); *F16D 65/22* (2013.01); *F16D 65/60* (2013.01); *B23K 2201/006* (2013.01); *F16D 2051/003* (2013.01); *F16D 2125/30* (2013.01)

(58) Field of Classification Search
CPC . B23K 2201/006; B23K 20/12–20/129; B23K 2201/005; B23K 2201/04–2201/06; F16D 51/20; F16D 65/60; F16D 65/22; F16D 2125/30; F16D 2051/003
USPC .............................. 228/112.1–114.5, 2.1–2.3
See application file for complete search history.

(56) References Cited

U.S. PATENT DOCUMENTS

| | | |
|---|---|---|
| 3,238,612 A | 3/1966 | Herman |
| 3,444,611 A | 5/1969 | Bogart |
| 3,465,545 A | 9/1969 | Stamm |
| 3,631,585 A | 1/1972 | Stamm |
| 4,087,038 A | 5/1978 | Yagi |
| 4,242,888 A | 1/1981 | Komeiji et al. |
| 4,659,005 A | 4/1987 | Spindler |
| 4,711,008 A | 12/1987 | Nakamura |
| 4,768,839 A | 9/1988 | Spindler |
| 4,832,769 A | 5/1989 | Shantz et al. |
| 4,944,977 A | 7/1990 | Shantz et al. |
| 5,205,464 A | 4/1993 | Simon |

(Continued)

FOREIGN PATENT DOCUMENTS

| | | | |
|---|---|---|---|
| CN | 203567470 U | * | 4/2014 |
| EP | 2561951 A | * | 2/2013 |
| JP | 62114783 A | * | 5/1987 |

*Primary Examiner* — Kiley Stoner
(74) *Attorney, Agent, or Firm* — Brooks Kushman P.C.

(57) ABSTRACT

A method of making a bracket assembly for a brake assembly. The method may include friction welding a brake wing to a camshaft tube that may receive a camshaft for actuating a brake pad assembly. Rotation of the brake wing and/or the camshaft tube about an axis may be controlled to fix an angular position of the brake wing with respect to the camshaft tube within a predetermined tolerance.

20 Claims, 4 Drawing Sheets

(56) References Cited

U.S. PATENT DOCUMENTS

| | | | |
|---|---|---|---|
| 5,211,100 A | 5/1993 | Fuller et al. | |
| 5,213,250 A | 5/1993 | Simon | |
| 5,649,612 A | 7/1997 | Walker et al. | |
| 5,713,688 A | 2/1998 | McCallum | |
| 5,779,383 A | 7/1998 | McCallum | |
| 5,785,332 A | 7/1998 | Pollock et al. | |
| 6,240,806 B1* | 6/2001 | Morris | B60T 1/067 188/205 R |
| 6,295,893 B1 | 10/2001 | Ogawa et al. | |
| 6,334,571 B1* | 1/2002 | Shantz | B23K 20/12 228/112.1 |
| 7,537,224 B2* | 5/2009 | Morris | F16B 17/006 280/124.1 |
| 2004/0256439 A1* | 12/2004 | Pfeiler | B23K 20/12 228/112.1 |
| 2006/0169964 A1 | 8/2006 | Winter | |
| 2009/0200356 A1* | 8/2009 | Kawaura | B23K 20/12 228/2.3 |
| 2009/0212092 A1 | 8/2009 | Stol | |
| 2010/0159274 A1* | 6/2010 | Kleber | B23K 20/12 428/653 |
| 2011/0265330 A1 | 11/2011 | Johnston et al. | |
| 2013/0062396 A1* | 3/2013 | Davenport | B23K 20/129 228/102 |
| 2014/0018178 A1 | 1/2014 | Yoshida et al. | |
| 2015/0075926 A1* | 3/2015 | Moss | F16D 51/00 188/219.1 |
| 2015/0285297 A1 | 10/2015 | Khanfar | |
| 2015/0336203 A1 | 11/2015 | Zhai et al. | |

* cited by examiner

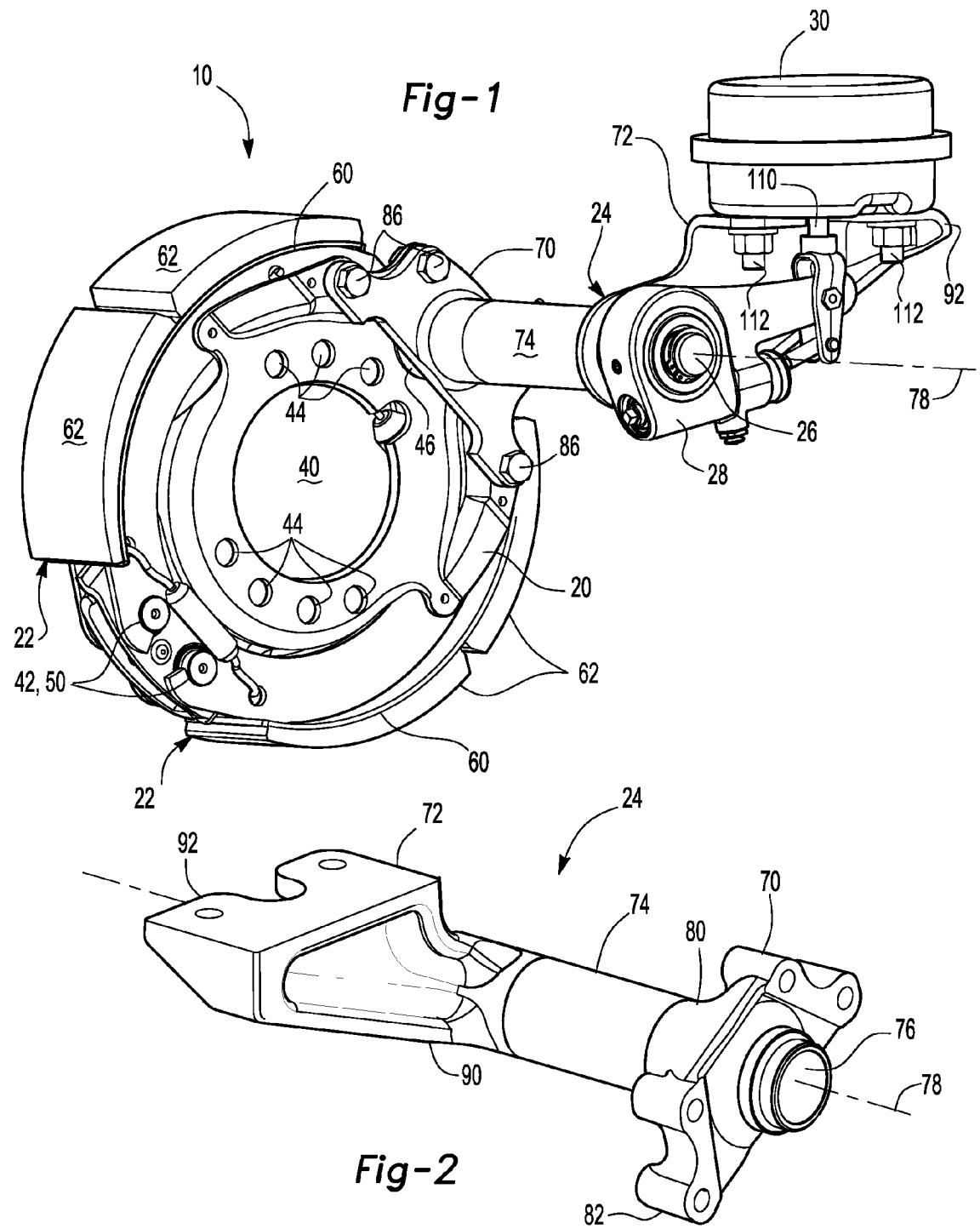

METHOD OF MAKING A BRACKET ASSEMBLY FOR A BRAKE ASSEMBLY

CROSS-REFERENCE TO RELATED APPLICATIONS

This application is a continuation of U.S. patent application Ser. No. 14/340,800, filed Jul. 25, 2014, the disclosure of which is hereby incorporated in its entirety by reference herein.

TECHNICAL FIELD

This patent application relates to a method of making a bracket assembly for a brake assembly.

BACKGROUND

A bracket for a vehicle brake assembly is disclosed in U.S. Pat. No. 5,649,612.

SUMMARY

In at least one embodiment, a method of making a bracket assembly for a brake assembly is provided. The method may include positioning a brake wing that has a brake wing end surface in a first fixture and positioning a camshaft tube that has a camshaft tube end surface in a second fixture. The brake wing may be friction welded to the camshaft tube by rotating at least one of the brake wing and the camshaft tube about an axis and engaging the brake wing end surface to the camshaft tube end surface. Rotation of the brake wing and/or the camshaft tube about the axis may be stopped to fix an angular position of the brake wing with respect to the camshaft tube within a predetermined tolerance.

In at least one embodiment, a method of making a bracket assembly for a brake assembly is provided. The method may include positioning a brake wing that has a brake wing end surface in a first fixture and positioning a camshaft tube that has a camshaft tube end surface in a second fixture. The brake wing may be friction welded to the camshaft tube by rotating at least one of the brake wing and the camshaft tube about an axis and engaging the brake wing end surface to the camshaft tube end surface. Rotation of the brake wing and/or the camshaft tube about the axis may be stopped to fix an angular position of the brake wing with respect to the camshaft tube within a predetermined tolerance. The brake wing and the camshaft tube may cooperate to at least partially define a hole for receiving a camshaft. A first internal curl may be generated in the hole proximate the brake wing during friction welding. A second internal curl may be generated in the hole proximate the camshaft tube during friction welding. The first internal curl and the second internal curl may be removed with a second curl tool after friction welding.

BRIEF DESCRIPTION OF THE DRAWINGS

FIG. 1 is a perspective view of an exemplary brake assembly having a bracket assembly.

FIG. 2 is a perspective view of the bracket assembly of FIG. 1.

DETAILED DESCRIPTION

Figure 3:
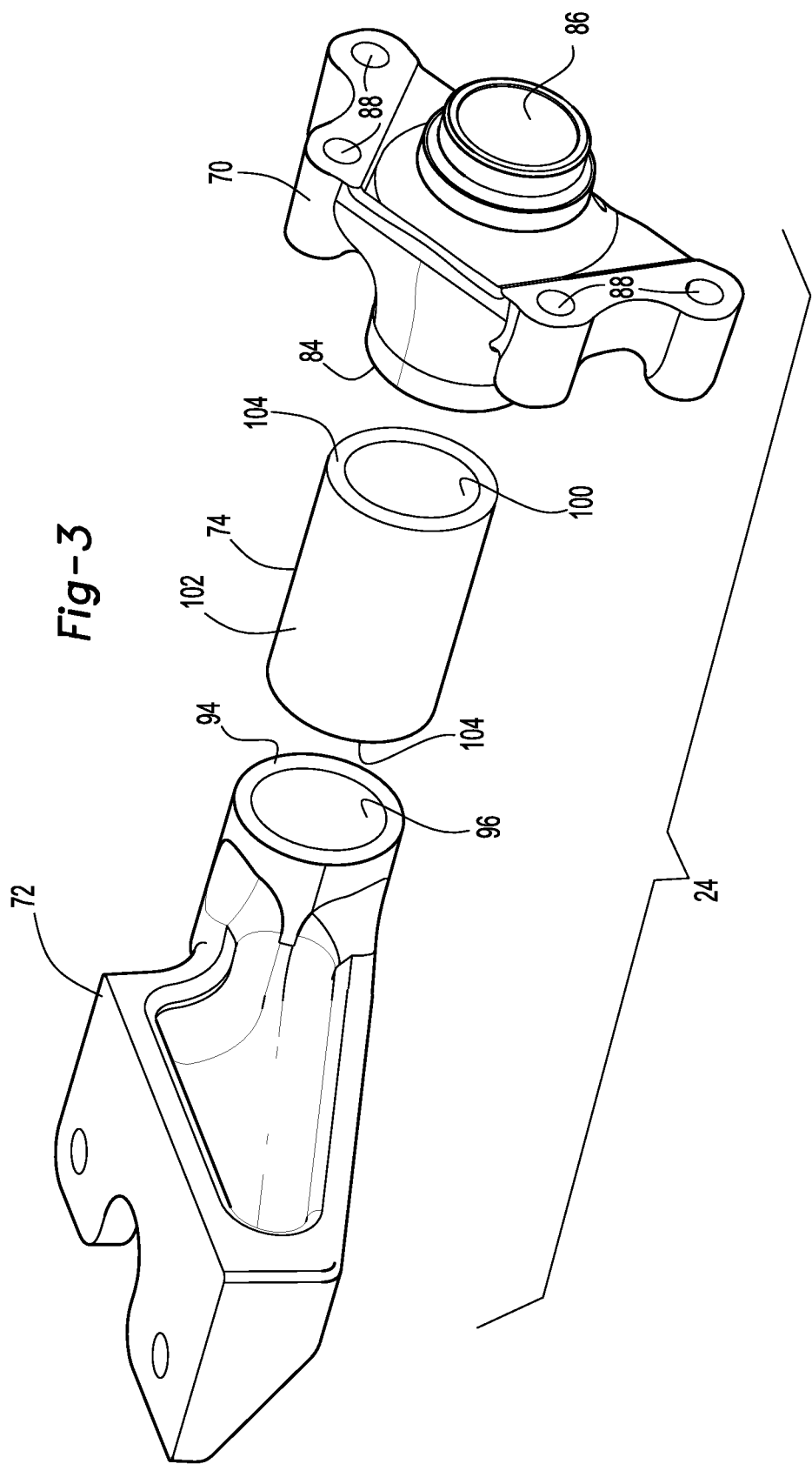
FIG. 3 is an exploded view of the bracket assembly of FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, an exemplary brake assembly 10 is shown. The brake assembly 10 may be provided with a vehicle, such as a motor vehicle like a truck, bus, farm equipment, mining equipment, military transport or weaponry vehicle, or cargo loading equipment for land, air, or marine vessels. In addition, the brake assembly 10 may be provided on a trailer that may be coupled to or provided with a motor vehicle.

The brake assembly 10 may be a friction brake that may be configured to slow or inhibit rotation of at least one associated wheel. In FIG. 1, the brake assembly 10 is depicted as a drum brake. In a drum brake configuration, a brake drum may extend continuously around brake pad assembly that may be configured to engage the brake drum to slow the rotation of a wheel. The brake drum may be disposed between a wheel and a wheel hub assembly that may rotatably support the wheel. In at least one embodiment, the brake assembly 10 may include a spider 20, at least one brake pad assembly 22, a bracket assembly 24, a camshaft 26, a slack adjuster 28, and an actuator 30.

The spider 20, which may also be called a brake spider, may support various components of the brake assembly 10. In addition, the spider 20 may facilitate mounting of the brake assembly 10 to the vehicle. For example, the spider 20 may be fixedly disposed on or fixedly positioned with respect to an axle assembly or a steering knuckle. In at least one embodiment, the spider 20 may include a hole 40 through which an axle and/or a spindle may extend. For example, a spindle may extend through the hole 40 and may support one or more wheel bearings that may support and facilitate rotation of a wheel assembly. The spider 20 may also include at least one anchor pin hole 42, at least one spider mounting hole 44, and a camshaft opening 46.

The anchor pin hole 42 may receive an anchor pin 50 that may facilitate mounting and operation of a brake pad assembly 22 will be discussed in more detail below. In FIG. 1, two anchor pin holes 42 are provided that are generally disposed opposite the bracket assembly 24. Each anchor pin hole 42 may receive a different anchor pin 50 and each anchor pin 50 may support a different brake pad assembly 22.

A spider mounting hole 44 may facilitate mounting of the spider 20 to the vehicle. In FIG. 1, a plurality of spider mounting holes 44 are arranged around the hole 40. Each spider mounting hole 44 may receive a fastener, such as a bolt, that may extend through the spider mounting hole 44 and couple the spider 20 to another component, such as an axle assembly or a steering knuckle.

The camshaft opening 46 may receive the camshaft 26 and optionally a portion of the bracket assembly 24. The camshaft 26 may extend through the camshaft opening 46 to engage one or more brake pad assemblies 22.

One or more brake pad assemblies 22 may be disposed proximate the spider 20. In FIG. 1, two brake pad assemblies 22 are shown that may be generally disposed opposite each other. The brake pad assembly 22 may include a brake shoe 60 and a friction material 62.

The brake shoe 60 may be a structural member of a brake pad assembly 22. The brake shoe 60 may be pivotally mounted to the spider 20 at a first end via the anchor pin 50. For example, the anchor pin 50 may be fixedly positioned with respect to the spider 20 and the brake shoe 60 may pivot about an outer surface or circumference of the anchor pin 50 when the brake pad assembly 22 is actuated. An opposite end of the brake shoe 60 may have a cam roller that may be configured to engage a cam of the camshaft 26.

The friction material 62, which may also be called a brake lining, may be disposed on an outer surface of the brake shoe 60 and may face toward the brake drum. The friction material 62 may engage the brake drum during vehicle braking and may be spaced apart from the brake drum when the friction braking is not being applied.

Referring to FIGS. 1 and 2, the bracket assembly 24 may facilitate mounting of the camshaft 26, the slack adjuster 28, and the actuator 30. The bracket assembly 24 may include a mounting flange 70, a brake wing 72, and a camshaft tube 74. In at least one embodiment, the mounting flange 70, brake wing 72, and camshaft tube 74 may be provided as separate components. It is also contemplated that the mounting flange 70 may be integrally formed with the camshaft tube 74 or the brake wing 72 may be integrally formed with the camshaft tube 74, thereby resulting in a two piece bracket assembly configuration. In addition, the bracket assembly 24 may have a hole 76 that may receive the camshaft 26. The hole 76 may be a through hole that may extend through the bracket assembly 24. The hole 76 may extend along an axis 78 and may be defined by the camshaft tube 74 and optionally by hole portions in the mounting flange 70 and/or the brake wing 72.

The mounting flange 70 may facilitate mounting of the bracket assembly 24 to the spider 20. The mounting flange 70 may be spaced apart from the brake wing 72 and may be fixedly coupled to the camshaft tube 74 with an adhesive as will be discussed in more detail below. In at least one embodiment, the mounting flange 70 may have a mounting flange body 80 and a flange portion 82.

The mounting flange body 80 may be fixedly positioned on the camshaft tube 74. In at least one embodiment like that shown in FIGS. 2 and 3, the mounting flange body 80 may have a generally tubular portion that may define a portion of the hole 76 through which the camshaft 26 may extend. In such a configuration, the mounting flange body 80 may have an end surface 84 and an interior surface 86. The interior surface 86 may extend from the end surface 84 and may be radially disposed about the axis 78 and may partially define the hole 76. The interior surface 86 may be spaced apart from the camshaft 26 to facilitate rotation of the camshaft 26 and to provide a cavity for receiving lubricant. The portion of the hole 76 in the mounting flange body 80 may receive various components in addition to the camshaft 26. For example, the portion of the hole 76 may receive a bearing or bushing that may extend around the camshaft 26 to rotatably support the camshaft 26. One or more seals may also extend around the camshaft 26 to help contain a lubricant, such as grease, inside the hole 76 to lubricate the bearing or bushing.

The flange portion 82 may be configured to be mounted to the spider 20. The flange portion 82 may extend outwardly from the mounting flange body 80 and may be integrally formed with the mounting flange body 80 in one or more embodiments. For example, the mounting flange body 80 and flange portion 82 may be cast as a unitary one-piece component. The flange portion may 82 may be fixedly positioned with respect to the camshaft tube 74. In addition, the flange portion 82 may include at least one mounting hole 88 that may be aligned with a corresponding mounting hole on the spider 20. The mounting hole 88 may receive a fastener that may couple the mounting flange 70 to the spider 20 as is best shown in FIG. 1. The mounting hole 88 may be provided in the flange portion 82 before or after the mounting flange 70 is attached to the camshaft tube 74 as will be discussed in more detail below.

The brake wing 72 may be coupled to the camshaft tube 74 and may support the actuator 30. The brake wing 72 may be spaced apart from the spider 20 and may be fixedly coupled to the camshaft tube 74 opposite the mounting flange 70. In at least one embodiment, the brake wing 72 may include a brake wing body 90 and a brake wing flange portion 92.

The brake wing body 90 may be disposed proximate and may be coupled to the camshaft tube 74. In at least one embodiment, the brake wing body 90 may have a generally tubular portion that may define a portion of the hole 76 through which the camshaft 26 may extend. In such a configuration, the brake wing body 90 may have a brake wing end surface 94 and an interior surface 96. The interior surface 96 may extend from the brake wing end surface 94 and may be radially disposed about the axis 78 and may partially define the hole 76. The interior surface 96 may be spaced apart from the camshaft 26 to facilitate rotation of the camshaft 26 and provide a cavity for receiving lubricant.

The portion of the hole 76 in the brake wing body 90 may receive various components in addition to the camshaft 26. For example, the portion of the hole 76 in the brake wing body 90 may receive a bearing, bushing, and/or one or more seals like those previously described.

The brake wing flange portion 92 may be configured to support the actuator 30. The brake wing flange portion 92 may extend outwardly from the brake wing body 90 and may be integrally formed with the brake wing body 90 in one or more embodiments. For example, the brake wing body 90 and brake wing flange portion 92 may be cast as a unitary one-piece component. The brake wing flange portion 92 may include an actuator mounting surface 98. The actuator mounting surface 98 may be generally planar and may have one or more actuator mounting holes and an actuator shaft opening. Each actuator mounting hole may receive a fastener that may couple the actuator 30 to the brake wing 72.

The camshaft tube 74 may extend from the mounting flange 70 to the brake wing 72. The camshaft tube 74 may have a generally tubular configuration and may define at least a portion of the hole 76 through which the camshaft 26 may extend. For instance, the camshaft tube 74 may extend along the axis 78 and may have an inner surface 100 and an outer surface 102 as is best shown in FIGS. 2 and 3. The inner surface 100 may be radially disposed about the axis 78 and may at least partially define the hole 76. The outer surface 102 may be disposed opposite the inner surface 100. The outer surface 102 may be an exterior surface of the camshaft tube 74 and may also be radially disposed about the axis 78, but may be located further from the axis 78 than the inner surface 100. The camshaft tube 74 may also have at least one camshaft tube end surface 104. Two camshaft tube end surfaces 104 may be provided at opposite ends of the camshaft tube 74 when the mounting flange 70 or brake wing 72 are not integrally formed with the camshaft tube 74. The camshaft tube end surfaces 104 may have similar configurations and may be mirror images of each other in one or more embodiments. In addition, the camshaft tube end surfaces may extend substantially perpendicular with respect to the axis 78 in one or more embodiments. For convenience in reference, the camshaft tube end surface 104 that may be disposed proximate to the mounting flange 70 may be referred to as the first camshaft tube end surface and the camshaft tube end surface 104 that may be disposed proximate to the brake wing 72 may be referred to as a second camshaft tube end surface.

The camshaft tube 74 may interconnect the mounting flange 70 and/or the brake wing 72 in various configurations as will be described in more detail below. Moreover, the mounting flange 70 or the brake wing 72 may be integrally formed with the camshaft tube 74 or may have a unitary one-piece configuration with the camshaft tube 74 in one or more embodiments.

Referring to FIG. 1, the camshaft 26 may be configured to actuate the brake pad assemblies 22. The camshaft 26 may extend along and may rotate about the axis 78. The camshaft 26 may extend through the camshaft opening 46 in the spider 20 and the hole 76 in the bracket assembly 24. The camshaft 26 may include a cam disposed at a first end. The cam may be an S-cam and may be configured to engage the cam roller on the brake shoe 60. Rotation of the camshaft 26 may actuate the brake pad assemblies 22 such that the friction material 62 moves toward or engages an inner surface of the brake drum to brake or slow or inhibit rotation of an associated wheel. The camshaft 26 may also include a second end that is disposed opposite the first end. The second end of the camshaft 26 may be disposed proximate and may engage the slack adjuster 28.

The slack adjuster 28 may be provided to compensate for brake wear or wear of the friction material 62. The slack adjuster 28 may be fixedly disposed near the second end of the camshaft 26. For example, the slack adjuster 28 may have a mounting hole that may receive the camshaft 26. The slack adjuster 28 may be coupled to the camshaft 26 in any suitable manner. For instance, the mounting hole of the slack adjuster 28 and the camshaft 26 may have mating splines that may help couple the slack adjuster 28 and a camshaft 26 together.

The actuator 30 may be provided to actuate the camshaft 26. The actuator 30 may be of any suitable type, such as a pneumatic, hydraulic, electrical, or electromechanical actuator. The actuator 30 may include an actuator shaft 110 that may extend toward or to the slack adjuster 28. For example, the actuator shaft 110 may extend through the actuator shaft opening in the brake wing 72. The actuator 30 may move between a retracted position and an extended position. In the retracted position, the camshaft 26 may be positioned such that a brake pad assembly 22 does not engage the brake drum to brake or inhibit rotation of an associated vehicle wheel assembly. In the extended position, the actuator 30 may rotate the camshaft 26 and actuate the brake pad assemblies 22 to move toward and engage the brake drum to inhibit rotation of an associated wheel hub assembly. The actuator 30 may be fixedly mounted to the brake wing 72. For example, the actuator 30 may include one or more mounting features 112, such as a threaded mounting stud that may extend through a mounting hole in the brake wing flange portion 92 and that may receive a washer and nut to fixedly couple the actuator 30 to the brake wing 72.

Figures 4, 5:
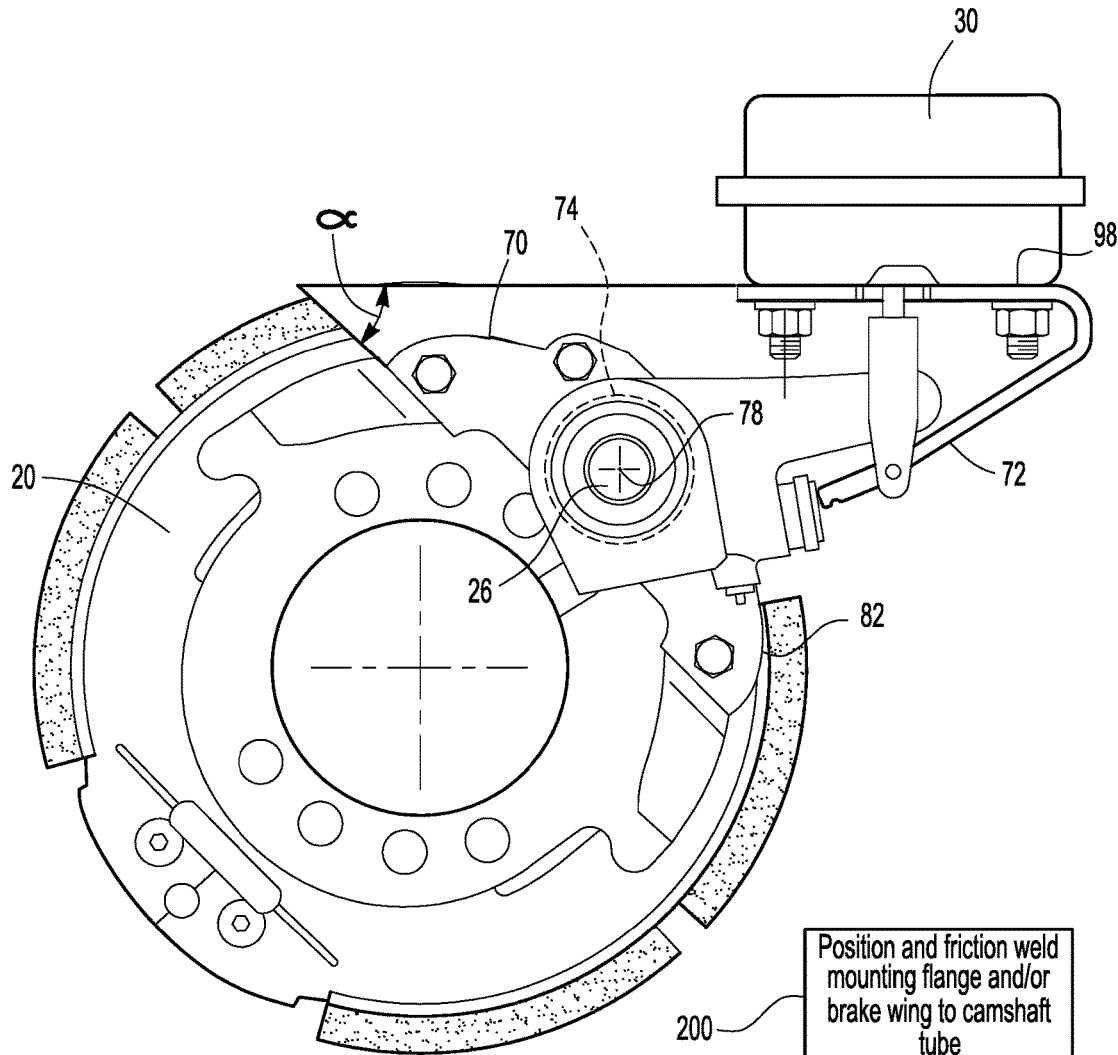
FIG. 4 is a side view of the brake assembly of FIG. 1.
FIG. 5 is a flowchart of a method of making a bracket assembly.

Referring to FIG. 5, a flowchart of a method of making a bracket assembly is shown. The method steps are designated with reference numbers 200, 202, 204, and 206. As an overview, the method may include friction welding the camshaft tube 74 to one or more other components in a manner that obtains a sufficient degree of rotational or angular alignment. Subsequent manufacturing steps may be performed to compensate for minor rotational or angular misalignment and/or to remove material and perform finishing operations.

At block 200, the method may begin by positioning and rotary friction welding one or more components to the camshaft tube 74. For example, the mounting flange 70 and/or the brake wing 72 may be rotary friction welded to the camshaft tube 74 depending on whether these components are separate from or provided with the camshaft tube 74. For instance, the mounting flange 70 and the brake wing 72 may be friction welded at opposite ends of the camshaft tube 74 when these components are not integral with the camshaft tube 74. Rotary friction welding of the mounting flange 70 and brake wing 72 to the camshaft tube 74 may occur sequentially or simultaneously. Alternatively, the mounting flange 70 may be friction welded to the camshaft tube 74 when the brake wing 72 is integrally formed with the camshaft tube 74 or the brake wing 72 may be friction welded to the camshaft tube 74 when the mounting flange 70 is integrally formed with the camshaft tube 74. For convenience in reference, the term "first part" and reference number 210 will be used to generically reference the mounting flange 70 or the brake wing 72 in FIGS. 6-8. Similarly, end surface 214 will be used to generically reference the end surface 84 of the mounting flange 70 or the brake wing end surface 94 of the brake wing 72.

Figure 6:
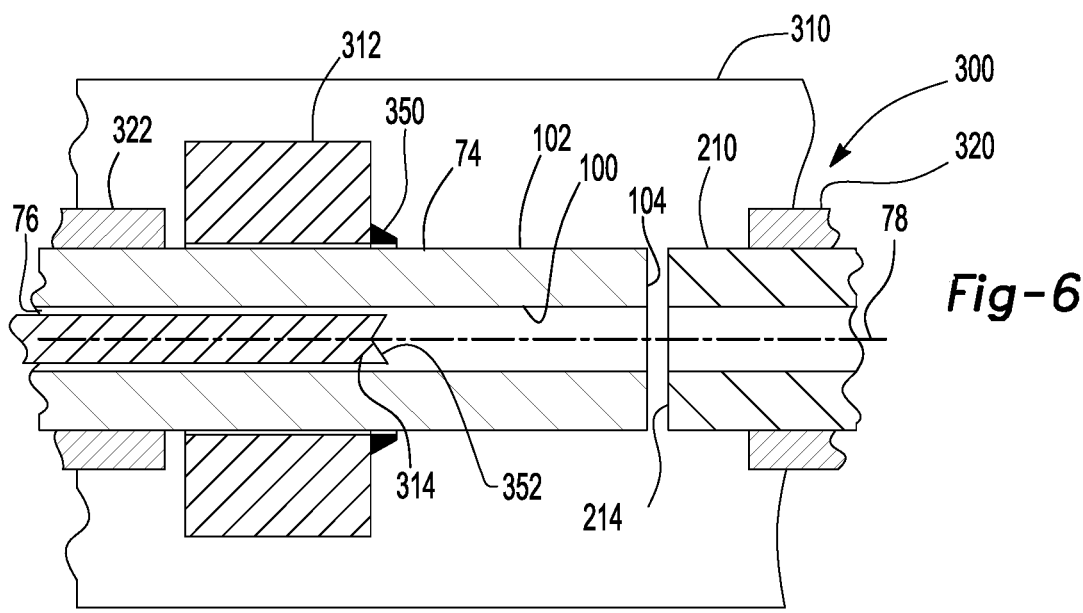
FIG. 6-8 illustrate various steps associated with the method of FIG. 4.
Figure 7:
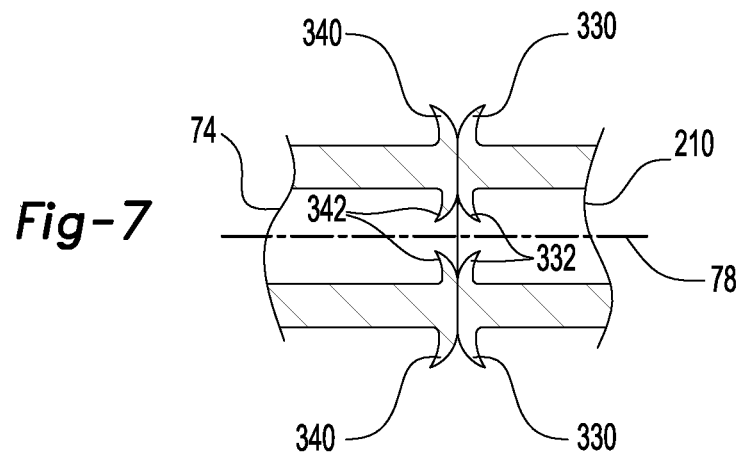
Figure 8:
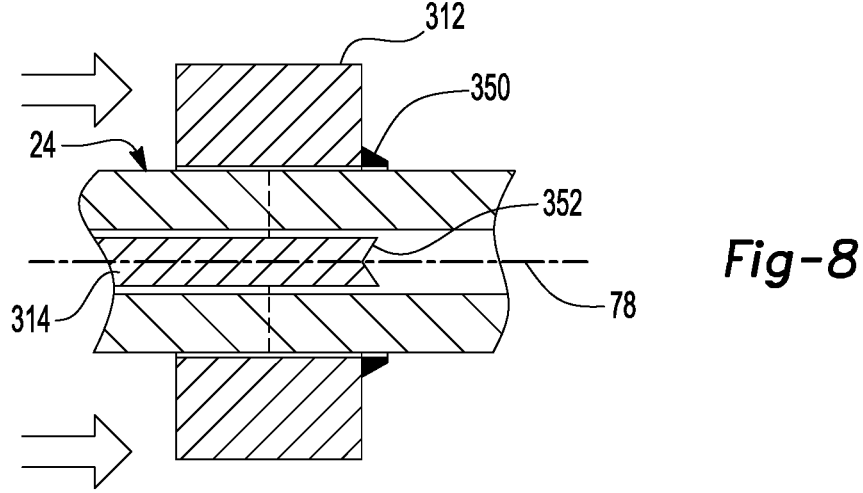

The camshaft tube 74 may be rotary friction welded to the first part 210 using a friction welding system 300. An example of a friction welding system 300 and associated components is shown in FIGS. 6-8. In at least one embodiment, the friction welding system 300 may include a friction welder 310, a first curl tool 312, and a second curl tool 314.

The friction welder 310 may be configured to rotary friction weld the camshaft tube 74 and the first part 210 together. Rotary friction welding may eliminate the use of MIG welds and may allow for lighter weight and/or less stiff materials such as aluminum alloys to be used in a brake assembly. Moreover, rotary friction welds may allow weld joints to be located in areas that are less susceptible to cracking or weld failure. In addition, rotary friction welds in conjunction with case parts may help provide stronger and stiffer brake assembly configurations as compared with stamped parts and tubing. The friction welder 310 may have a first fixture 320 that may receive the first part 210 and a second fixture 322 that may receive the camshaft tube 74. The first fixture 320 and/or the second fixture 322 may be configured to rotate about the axis 78. For example, the first fixture 320 may rotate the first part 210 about the axis 78 while the second fixture 322 does not rotate the camshaft tube 74 about the axis 78. Alternatively, the second fixture 322 may rotate the camshaft tube 74 about the axis 78 while the first fixture 320 does not rotate the first part 210 about the axis 78. As another option, the first fixture 320 and the second fixture 322 may both rotate simultaneously about the axis 78 but at different velocities. Initially, the camshaft tube 74 may be spaced apart from the first part 210 until the first part 210 and/or camshaft tube 74 achieves a target rotational velocity.

The first fixture 320 and/or the second fixture 322 may be configured to move along the axis 78. For example, the first fixture 320 may be configured to move the first part 210 along the axis 78 toward the camshaft tube 74 and/or the second fixture 322 may be configured to move the camshaft tube 74 along the axis 78 toward the first part 210. As such, the first fixture 320 and the second fixture 322 may cooperate to engage the camshaft tube 74 and the first part 210 and may apply an axial load to facilitate rotary friction welding. More specifically, the camshaft tube 74 and the first part 210 may be engaged after a target rotational velocity is obtained. For example, the end surface 214 of the first part 210 may be placed in engagement with the camshaft tube end surface 104, thereby generating frictional heat proximate the engaging surfaces. Such frictional heating may be supplemented by non-frictional heating. For example, the camshaft tube 74 and/or the first part 210 may be heated by induction heating, resistance heating, or an external heat source.

A lateral force or axial load may be imparted on the camshaft tube 74 and/or the first part 210 to plastically displace and fuse the camshaft tube 74 and the first part 210 together during rotary friction welding. For example, the lateral force or axial load may force the camshaft tube 74 toward the first part 210 or vice versa.

As is best shown in FIG. 7, the lateral force or axial load may generate one or more curls on the camshaft tube 74 and the first part 210. For instance, a first external curl 330 and a first internal curl 332 may be generated from the first part 210 while a second external curl 340 and a second internal curl 342 may be generated from the camshaft tube 74. The first external curl 330 and the first internal curl 332 may generally extend away from the axis 78 and may curl away from each other. Moreover, first external curl 330 and the second external curl 340 may extend in a continuous ring about the axis 78. The first internal curl 332 and the second internal curl 342 may also extend in a continuous ring about the axis 78, but may be disposed in the hole 76 and may extend toward the axis 78. The first internal curl 332 and the second internal curl 342 may curl away from each other. The amount of material displaced and the size of the curls may increase as rotary friction welding progresses and the camshaft tube 74 in the first part 210 continue to rotate with respect to each other.

At block 202, the first fixture 320 and/or the second fixture 322 may be braked to align the camshaft tube 74 and the first part 210 or to set an angular position of the camshaft tube 74 with respect to the first part 210 within a predetermined tolerance. The first fixture 320 and/or the second fixture 322 may be braked using a brake or other rotation retarding device that may be provided with the friction welder 310 in a manner known by those skilled in the art. Braking of the first fixture 320 may halt rotation of the first part 210 about the axis 78. Similarly, braking of the second fixture 322 may halt rotation of the camshaft tube 74 about the axis 78. Braking of first fixture 320 and/or the second fixture 322 may quickly terminate rotation of a fixture and an associated part about the axis 78 so that the relative rotational position about the axis 78 of the first part 210 with respect to the camshaft tube 74 or the relative rotational position about the axis 78 of the mounting flange 70 with respect to the brake wing 72 and/or camshaft tube 74 may be obtained or set with a sufficient degree of accuracy. Braking may occur rapidly to halt rotation about the axis 78. As an example, braking may occur within a short period of time, such as in less than two seconds.

Braking of the first fixture 320 and/or the second fixture 322 may help obtain or achieve a desired angular alignment between camshaft tube 74 and the first part 210 and hence may help obtain or achieve a desired angular alignment between the mounting flange 70 and the brake wing 72. In angular alignment may be specified so that the brake wing 72 extends in a desired direction when the mounting flange 70 is mounted on the spider 20. For example, in FIG. 4 the bottom edge of the mounting flange 70 and line 344 which may be coextensive with the bottom edge may be oriented at an angle $\alpha$ with respect to the actuator mounting surface 98 of the brake wing 72, although it is contemplated that angular position may be measured with respect to different surfaces or datum points. Moreover, angle $\alpha$ may be oriented with respect to the axis 78 as represented by line 344' or any line disposed parallel to line 344. In these examples, the angle $\alpha$ is approximately 45°. Thus, controlled braking of the first fixture 320 and/or the second fixture 322 may provide a desired angular positioning between the mounting flange 70 and the brake wing 72 or a desired angular position within a predetermined tolerance. The predetermined tolerance may be based on the design specifications of the bracket assembly. For example, the predetermined tolerance may be +/−2° of with respect to a desired or target angular position. Failure to obtain the desired or target angular position within a predetermined tolerance may result in an unusable bracket assembly since the rotational position of the rotary friction welded components may not be altered once rotary friction welding is complete without damaging or affecting the integrity of the bracket assembly.

At block 204, the external curls 330, 340 and/or the internal curls 332, 342 that were generated during rotary friction welding may be removed or formed. More specifically, the external curls 330, 340 may be removed or formed using the first curl tool 312 and the internal curls 332, 342 may be removed or formed using the second curl tool 314. Forming of external and internal curls is described in U.S. patent application Ser. No. 14/284,441, which is assigned to the assignee of the present invention and is hereby incorporated by reference in its entirety. An example of removal of the external curls 330, 340 and the internal curls 332, 342 is shown with reference to FIGS. 6 and 8.

Referring to FIG. 6, the first curl tool 312 and the second curl tool 314 are shown in an exemplary initial position that may be spaced apart from or remotely located with respect to the friction weld interface where the curls may be formed. In at least one embodiment, the first curl tool 312 may extend around the camshaft tube 74 while the second curl tool 314 may be disposed in the hole 76 in the camshaft tube 74. It is also contemplated that the first curl tool 312 may extend around the first part 210 and the second curl tool 314 may be disposed in the hole 76 in the first part 210 in one or more embodiments. The first curl tool 312 and the second curl tool 314 may be spaced apart from the camshaft tube 74 and/or the first part 210 to allow the camshaft tube 74 and/or the first part 210 to rotate about the axis 78 to facilitate rotary friction welding in one or more embodiments.

The first curl tool 312 may be configured to remove the first external curl 330 and/or the second external curl 340. For example, the first curl tool 312 may be configured to move along the axis 78 from the initial position to engage and cut or mechanically separate the first external curl 330 and the second external curl 340 from the bracket assembly 24. The first curl tool 312 may have any suitable configuration. For example, the first curl tool 312 may be configured as a ring that may extend continuously around the camshaft tube 74 and may have a cutting surface 350 that may be configured to engage and cut or mechanically sever the first external curl 330 and the second external curl 340 when the first curl tool 312 is moved to an extended position as is shown in FIG. 8.

The second curl tool 314 may be configured to remove the first internal curl 332 and/or the second internal curl 342. For example, the second curl tool 314 may be configured to move along the axis 78 from the initial position to engage and cut or mechanically separate the first internal curl 332 and the second internal curl 342 from the bracket assembly 24. The second curl tool 314 may have any suitable configuration. For example, the second curl tool 314 may be configured as a shaft that may extend into the hole 76 and may have a cutting surface 352 that may be configured to engage and cut or mechanically sever the first internal curl 332 and the second internal curl 342 when the second curl tool 314 is moved to an extended position as is shown in FIG. 8.

The external curls 330, 340 and/or the internal curls 332, 342 may be removed shortly after braking is complete or while the curls are still hot and more easily severed from the bracket assembly 24. The first curl tool 312 and the second curl tool 314 may then be actuated back to their initial positions after the curls are removed.

At block 206, one or more mounting holes 88 may be drilled in the mounting flange 70 if the mounting flange 70 was not provided with one or more mounting holes 88 prior to rotary friction welding. The mounting flange 70 may be provided with mounting holes 88 prior to rotary friction welding when a desired angular alignment can be consistently and accurately obtained during the braking step at block 202. The mounting flange 70 may not be provided with mounting holes 88 prior to rotary friction welding when a desired angular alignment cannot be constantly and accurately obtained during braking. As such, the mounting holes 88 may be drilled after rotary friction welding and/or after curl removal so that the mounting holes 88 are provided in a position that will result in the brake wing 72 being positioned properly or at a desired angular position when the mounting flange 70 is attached to the spider 20. Accordingly, drilling the mounting holes after rotary friction welding may help accommodate angular misalignment between the mounting flange 70 and the brake wing 72. For instance, the bracket assembly 24 may be placed in a fixture that may position the bracket assembly 24 at a desired rotational position with respect to the axis 78 and the brake wing 72 or another suitable datum. Then the holes may be drilled through the mounting flange 70 in a desired location with respect to the brake wing 72, axis 78, and/or datum. Additional manufacturing steps or finishing steps, such as final machining or drilling one or more holes for grease fittings may also be performed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of making a bracket assembly for a brake assembly, the method comprising:
   positioning a brake wing that has a brake wing end surface in a first fixture, the brake wing being configured to support an actuator for actuating a camshaft;
   positioning a camshaft tube that has a camshaft tube end surface in a second fixture;
   friction welding the brake wing to the camshaft tube by rotating at least one of the brake wing and the camshaft tube about an axis and engaging the brake wing end surface to the camshaft tube end surface; and
   stopping rotation of the brake wing and/or the camshaft tube about the axis to fix an angular position of the brake wing with respect to the camshaft tube within a predetermined tolerance, wherein a first external curl is generated proximate the brake wing and a second external curl is generated proximate the camshaft tube during friction welding, and the first external curl and the second external curl are removed with a first curl tool after stopping rotation of the camshaft tube or the brake wing or the camshaft tube and the brake wing about the axis.

2. The method of claim 1 wherein the camshaft tube includes a mounting flange that is disposed opposite the camshaft tube end surface.

3. The method of claim 1 wherein the brake wing rotates about the axis and the camshaft tube does not rotate about the axis during friction welding and rotation of the brake wing about the axis is stopped by braking the first fixture.

4. The method of claim 1 wherein the camshaft tube rotates about the axis and the brake wing does not rotate about the axis during friction welding and rotation of the camshaft tube about the axis is stopped by braking the second fixture.

5. The method of claim 2 wherein the mounting flange is integrally formed with the camshaft tube.

6. The method of claim 1 wherein the first curl tool is configured as a ring that extends around the camshaft tube and that moves along the axis to sever the first external curl from the brake wing and the second external curl from the camshaft tube after friction welding.

7. The method of claim 1 wherein the brake wing and the camshaft tube cooperate to define a hole for receiving the camshaft, wherein a first internal curl is generated in the hole proximate the brake wing and a second internal curl is generated in the hole proximate the camshaft tube during friction welding and the first internal curl and the second internal curl are removed with a second curl tool after friction welding.

8. A method of making a bracket assembly for a brake assembly, the method comprising:
   positioning a brake wing that has a brake wing end surface in a first fixture, the brake wing being configured to support an actuator for actuating a camshaft;
   positioning a camshaft tube that has a camshaft tube end surface in a second fixture;
   friction welding the brake wing to the camshaft tube by rotating at least one of the brake wing and the camshaft tube about an axis and engaging the brake wing end surface to the camshaft tube end surface;
   stopping rotation of the brake wing and/or the camshaft tube about the axis to fix an angular position of the brake wing with respect to the camshaft tube within a predetermined tolerance; and
   providing a mounting flange that has an end surface and friction welding the mounting flange to the camshaft tube along a second camshaft tube end surface that is disposed opposite the brake wing by rotating at least one of the mounting flange and the camshaft tube about the axis and engaging the end surface to the second camshaft tube end surface and stopping rotation of the mounting flange or the camshaft tube or the mounting flange and the camshaft tube about the axis to fix an angular position of the mounting flange with respect to the brake wing within a predetermined tolerance.

9. The method of claim 8 further comprising drilling a mounting hole in the mounting flange after fixing the angular position of the mounting flange with respect to the camshaft tube.

10. The method of claim 8 wherein the mounting flange, the brake wing, and the camshaft tube cooperate to define a hole that is configured to receive the camshaft for actuating a brake pad assembly.

11. The method of claim 8 wherein the mounting flange is configured to be mounted to a brake spider.

12. A method of making a bracket assembly for a brake assembly, the method comprising:
    positioning a brake wing that has a brake wing end surface in a first fixture;
    positioning a camshaft tube that has a camshaft tube end surface in a second fixture;
    friction welding the brake wing to the camshaft tube by rotating at least one of the brake wing and the camshaft tube about an axis and engaging the brake wing end surface to the camshaft tube end surface; and
    stopping rotation of the brake wing and/or the camshaft tube about the axis to fix an angular position of the brake wing with respect to the camshaft tube within a predetermined tolerance;
    wherein the brake wing and the camshaft tube cooperate to at least partially define a hole for receiving a camshaft, wherein a first internal curl is generated in the hole proximate the brake wing and a second internal curl is generated in the hole proximate the camshaft tube during friction welding and the first internal curl and the second internal curl are removed with a second curl tool after friction welding.

13. The method of claim 12 wherein the second curl tool is disposed in the hole and moves along the axis to sever the first internal curl from the brake wing and the second internal curl from the camshaft tube after friction welding.

14. The method of claim 12 wherein the camshaft tube includes a mounting flange that is disposed opposite the camshaft tube end surface, wherein the mounting flange is mounted to a brake spider.

15. The method of claim 14 wherein the mounting flange is friction welded to the camshaft tube along a second camshaft tube end surface that is disposed opposite the brake wing.

16. The method of claim 12 wherein the brake wing rotates about the axis and the camshaft tube does not rotate about the axis during friction welding and rotation of the brake wing about the axis is stopped by braking the first fixture.

17. The method of claim 12 wherein the camshaft tube rotates about the axis and the brake wing does not rotate about the axis during friction welding and rotation of the camshaft tube about the axis is stopped by braking the second fixture.

18. The method of claim 12 wherein a first external curl is generated proximate the brake wing and a second external curl is generated proximate the camshaft tube during friction welding, and the first external curl and the second external curl are removed with a first curl tool.

19. The method of claim 18 wherein the first external curl and the second external curl are removed after stopping rotation of the camshaft tube or the brake wing or the camshaft tube and brake wing about the axis.

20. The method of claim 18 wherein the first curl tool is configured as a ring that extends around the camshaft tube and that moves along the axis to sever the first external curl from the brake wing and the second external curl from the camshaft tube after friction welding.

\* \* \* \* \*